US011310236B2

(12) United States Patent
Rakshit et al.

(10) Patent No.: US 11,310,236 B2
(45) Date of Patent: Apr. 19, 2022

(54) DERIVING CONFIDENCE SCORES BASED ON DEVICE SHARING

(71) Applicant: INTERNATIONAL BUSINESS MACHINES CORPORATION, Armonk, NY (US)

(72) Inventors: Sarbajit K. Rakshit, Kolkata (IN); Craig M. Trim, Ventura, CA (US); Martin G. Keen, Cary, NC (US); Shikhar Kwatra, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 258 days.

(21) Appl. No.: 16/204,513

(22) Filed: Nov. 29, 2018

(65) Prior Publication Data

US 2020/0177595 A1 Jun. 4, 2020

(51) Int. Cl.
*H04L 9/40* (2022.01)
*G06N 3/08* (2006.01)
*H04L 29/06* (2006.01)

(52) U.S. Cl.
CPC ............. *H04L 63/102* (2013.01); *G06N 3/08* (2013.01)

(58) Field of Classification Search
CPC .................................................. H04L 63/102
USPC ............................................................ 726/4
See application file for complete search history.

(56) References Cited

U.S. PATENT DOCUMENTS

| 7,143,443 | B2 | 11/2006 | Song et al. | |
|---|---|---|---|---|
| 8,954,730 | B2 | 2/2015 | Roskind | |
| 9,160,786 | B1 * | 10/2015 | Jackson | H04L 67/306 |
| 9,544,331 | B2 * | 1/2017 | Wilson | H04L 63/20 |
| 9,727,886 | B2 * | 8/2017 | Rubinstein | G06Q 50/01 |
| 9,769,124 | B2 | 9/2017 | Yan | |
| 10,027,656 | B2 * | 7/2018 | Ho | H04L 63/083 |

(Continued)

FOREIGN PATENT DOCUMENTS

| CN | 103399858 | 11/2013 |
|---|---|---|
| CN | 105809510 | 7/2016 |

OTHER PUBLICATIONS

Zhang et al., "A portable TPM based on USB key," Proceedings of the 17th ACM conference on Computer and communications security (CCS '10), ACM, New York, NY, USA, pp. 750-752, Oct. 4-8, 2010, 3 pages.

(Continued)

*Primary Examiner* — Harris C Wang
(74) *Attorney, Agent, or Firm* — Brian Restauro; Andrew D. Wright; Roberts Calderon Safran & Cole, P.C.

(57) ABSTRACT

Systems and methods for deriving confidence scores based on device sharing are disclosed. In embodiments, a method includes receiving, by a computing device, sharing event data from a remote computing device in a comparative confidence environment, the sharing event data including usage data regarding the sharing of an electronic device between a first participant and a second participant obtained by the remote computing device during a sharing event; calculating, by the computing device, a comparative confidence score for the first participant and the second participant based on the sharing event data; and enabling, by the computing device, the first participant to gain access to a resource of the second participant based on the comparative confidence score.

19 Claims, 4 Drawing Sheets

(56) References Cited

U.S. PATENT DOCUMENTS

| | | | |
|---|---|---|---|
| 2004/0024912 A1 | 2/2004 | Fukao et al. | |
| 2012/0166533 A1* | 6/2012 | Rubinstein | G06Q 30/0224 |
| | | | 709/204 |
| 2012/0166553 A1* | 6/2012 | Rubinstein | G06Q 50/01 |
| | | | 709/204 |
| 2013/0185654 A1* | 7/2013 | Harris | H04W 76/10 |
| | | | 715/753 |
| 2014/0073245 A1* | 3/2014 | Frantz | H04L 67/1068 |
| | | | 455/41.2 |
| 2016/0021116 A1* | 1/2016 | Maguire | H04L 63/08 |
| | | | 726/4 |
| 2016/0301759 A1 | 10/2016 | Xue et al. | |
| 2017/0171180 A1* | 6/2017 | Britt | H04W 4/70 |
| 2018/0268473 A1* | 9/2018 | Um | H04L 41/022 |
| 2020/0177595 A1* | 6/2020 | Rakshit | H04L 63/1433 |

OTHER PUBLICATIONS

Liu et al., "UI Portals: Sharing Arbitrary Regions of User Interfaces on Traditional and Multi-user Interactive Devices," 2012 9th International Conference on Ubiquitous Intelligence and Computing and 9th International Conference on Autonomic and Trusted Computing, Fukuoka, pp. 957-962, 2012, 6 pages.

Matthews et al., "'She'll just grab any device that's closer': A Study of Everyday Device & Account Sharing in Households," Proceedings of the 2016 CHI Conference on Human Factors in Computing Systems (CHI '16), ACM, New York, NY, USA, pp. 5921-5932, Mar. 7-12, 2016, 12 pages.

\* cited by examiner

DERIVING CONFIDENCE SCORES BASED ON DEVICE SHARING

BACKGROUND

The present invention relates generally to data analytics and, more particularly, to deriving confidence scores based upon device sharing.

Advances in wireless technology and Internet-of-Things (IoT) devices have led to increasing opportunities for users to share electronic device and computational resources. For example, many mobile computing devices enable wireless pairing with other mobile computing devices and accessories (e.g., memory devices, headphones, etc.). Moreover, computing devices may be compatible with the same electrical charging device, enabling the sharing of such charging devices among users.

In general, confidence scores may be utilized to express a probability of some event. In general, high confidence scores are more likely to be good while low confidence scores are more likely to be bad. Confidence scores may be utilized to set a threshold indicating when an action should be taken. One example of a type of system that utilizes confidence scores is a computer-based question answering system.

SUMMARY

In an aspect of the invention, a computer-implemented method includes: receiving, by a computing device, sharing event data from a remote computing device in a comparative confidence environment, the sharing event data including usage data regarding the sharing of an electronic device between a first participant and a second participant obtained by the remote computing device during a sharing event; calculating, by the computing device, a comparative confidence score for the first participant and the second participant based on the sharing event data; and enabling, by the computing device, the first participant to gain access to a resource of the second participant based on the comparative confidence score.

In another aspect of the invention, there is a computer program product including a computer readable storage medium having program instructions embodied therewith. The program instructions are executable by a computing device to cause the computing device to: determine sharing event data regarding a sharing event wherein the computer device of a first participant utilizes a secondary device of a second participant, the sharing event data including usage data regarding usage of the secondary device; send the sharing event data to a remote confidence server; receive from the remote confidence server a permission notification based on the sharing event data; and enable access to a resource of the computer device based on the notification.

In another aspect of the invention, there is a system including: a processor, a computer readable memory and a computer readable storage medium associated with a computing device; program instructions to receive sharing event data from a remote computing device in a comparative confidence environment, the sharing event data including usage data regarding the sharing of an electronic device between a first participant and a second participant during a sharing event; program instructions to calculate a comparative confidence score for the first participant and the second participant based on the sharing event data; and program instructions to issue permissions to enable the first participant to gain access to a resource of the second participant based on the comparative confidence score, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
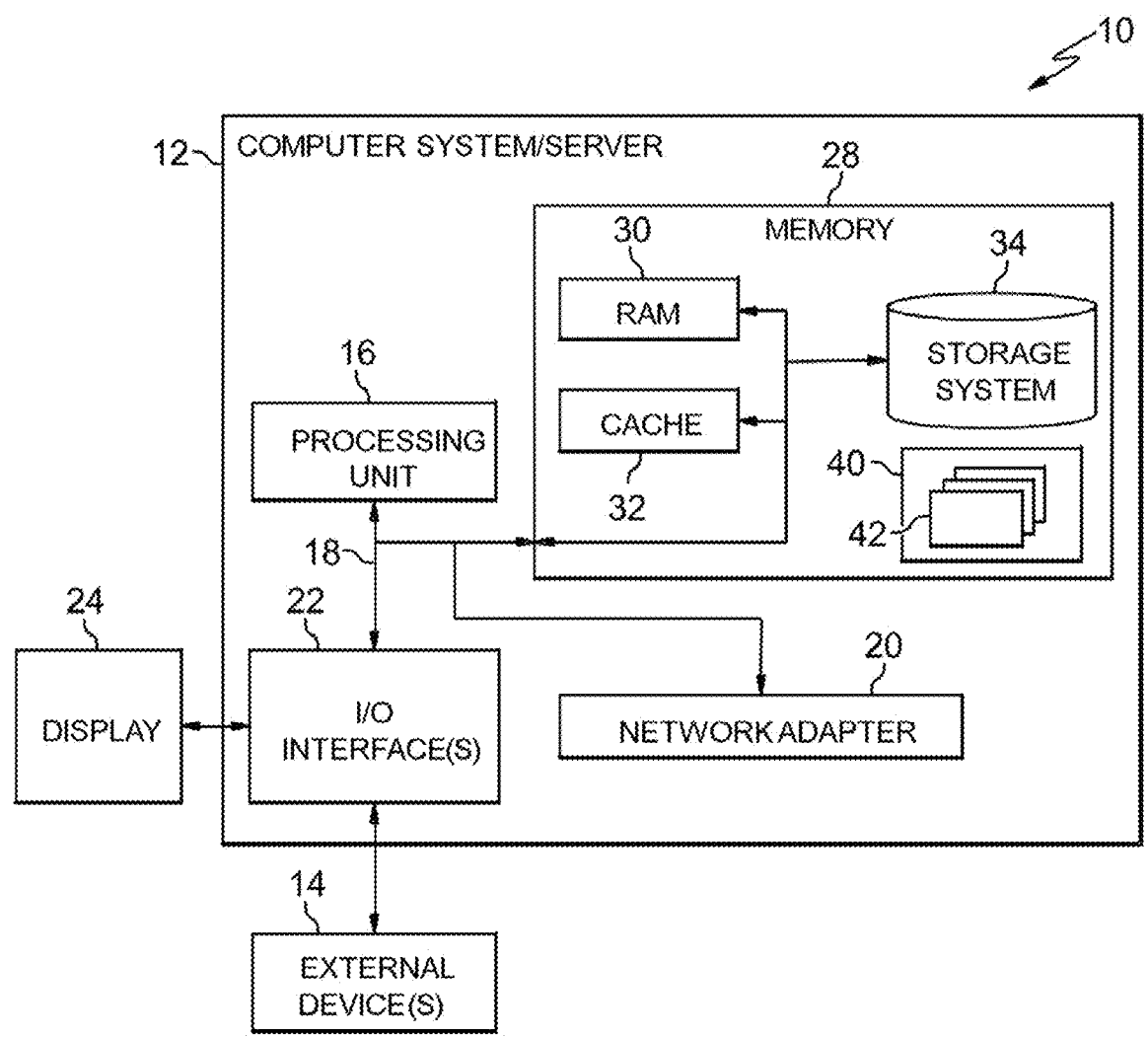
FIG. 1 depicts a computing infrastructure according to an embodiment of the present invention.

The present invention relates generally to data analytics and, more particularly, to deriving confidence scores based upon device sharing. In embodiments, a computing system calculates a comparative confidence score between two users by analyzing sharing and borrowing patterns of various devices, device accessories, and other items between users.

On a daily basis, humans collaborate with one another, and share electronic devices, device accessories or resources. For example, a person may borrow a friend or colleagues mobile phone charger or headphones. In another example, two people may share the same headphones in order to listen to a song together. Other examples of shared devices include portable storage devices, mobile phone chargers, mobile devices, etc.

Typically, when a first user lends a device or device accessory to a second user, the act of lending indicates a certain level of trust between the users. For example, a user will typically not share or lend a personal device to an unknown or sensitive person. Therefore, levels of confidence (representative of trust between users) may be derived by identifying patterns of sharing and borrowing between users. Accordingly, embodiments of the invention analyze the sharing and borrowing patterns of various devices, device accessories, or other items between users, and calculates a comparative confidence score between individual participants. In accordance with aspects of the invention, confidence based functionalities may be executed based on the comparative confidence score, such as auto-authentication and enabling of advertisements.

Advantageously, systems of the invention continuously and automatically update confidence scores of participants in a comparative confidence environment, thereby reflecting real-world dynamics between participants. Embodiments of the invention constitute technical improvements in the field of authentication and verification by providing an authorization system that leverages real-world sharing events as an indicator of trust between participants, and utilizes comparative confidence scores of participant pairs to derive overall confidence scores for individual participants. Moreover, implementations of the present invention provide a technical solution to the technical problem of permissions granting with respect to electronic devices, by enabling or initiating participant transactions (e.g., access of a first participant to a second participant's computing device) based on derived comparative or overall confidence scores.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
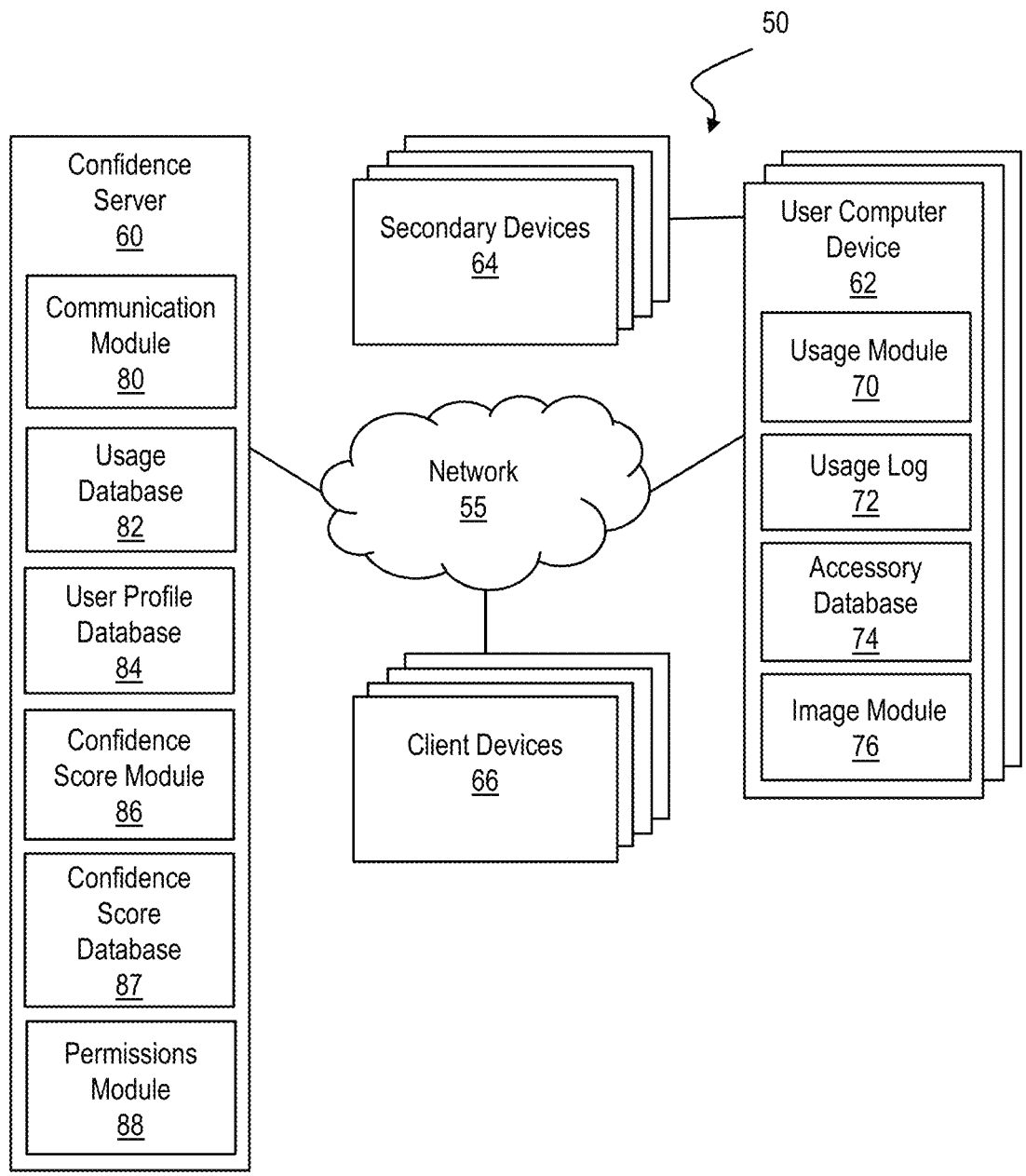
FIG. 2 shows an exemplary environment in accordance with aspects of the invention.

FIG. 2 shows an exemplary comparative confidence environment 50 in accordance with aspects of the invention. The comparative confidence environment 50 includes a network 55 connecting a confidence server 60 with a plurality of user computer devices 62, a plurality of secondary devices (e.g., electronic device accessories) represented at 64, and a plurality of client devices 66. In embodiments, the confidence server 60 comprises the computer system 12 of FIG. 1, and is connected to the network 55 via the network adapter 20 of FIG. 1. The confidence server 60 may be configured as a special purpose computing device that is part of a service provider's infrastructure. For example, the confidence server 60 may be configured as a cloud-based server configured to provide comparative confidence scores to a plurality of companies or organizations (e.g., via client devices 66). In another example, the confidence server 60 may be configured as a specialized server within an organization's infrastructure, configured to provide comparative confidence scores to members of the organization.

The network 55 may be any suitable communication network or combination of networks, such as a local area network (LAN), a general wide area network (WAN), and/or a public network (e.g., the Internet). The user computer devices 62 may be in the form of the computing device 12, and may be a desktop computer, laptop computer, tablet computer, smartphone, etc. In embodiments, the user computer device 62 runs an application program that provides an interface by which the user computer devices 62 provides comparative confidence data to the confidence server 60. The confidence server 60 may be configured to communicate with a plural different user computer devices 62 simultaneously, and perform functions separately for each user computer device 62 independent of the others.

The client devices 66 may be in the form of the computing device 12 of FIG. 1, and may be desktop computers, laptop computers, tablet computers, smartphones, etc. In embodiments, the client devices 66 run an application program that provides an interface by which the confidence server 60 can provide confidence information (e.g., confidence scores, authorizations or permissions) to the client device 66. In embodiments, the client devices 66 pay for the services provided by the confidence server 60. In aspects, the client devices 66 receive services from a cloud-based confidence server 60.

Still referring to FIG. 2, the user computer device 62 may include one or more program modules (e.g., program module 42 of FIG. 1) executed by the user computer device 62 and configured to perform one or more of the functions described herein. In embodiments, the user computer device 62 includes a usage module 70 configured to perform one or more of the following: detect the use of a secondary device (e.g., headphones, electrical chargers, memory devices, etc.); access an accessory database 74; receive image data from an image module 76; determine ownership of the secondary device; log secondary device usage data in a usage log 72; and send the sharing event data (e.g., ownership data, usage data, etc.) to the confidence server 60.

With continued reference to FIG. 2, the confidence server 60 may include one or more program modules (e.g., program module 42 of FIG. 1) executed by the confidence server 60 and configured to perform one or more of the functions described herein. In embodiments, the confidence server 60 includes a communication module 80 configured to receive sharing event data from one or more user computer devices 62 for storage in the usage database 82 and user profile data for storage in a user profile database 84. In implementations, the confidence server 60 includes a confidence score module 86 configured to calculate comparative confidence scores and overall confidence scores for participants, save the confidence scores in a confidence score database 87, and update the confidence scores on a periodic or continuous basis. In embodiments, the confidence server 60 includes a permissions module 88 configured to share confidence scores with authorized clients, determine whether to grant privileges to participants based on confidence scores, and/or initiate or enable a transaction based on the confidence scores or decision to grant privileges.

The quantity of devices and/or networks in the comparative confidence environment 50 is not limited to what is shown in FIG. 2. In practice, the comparative confidence environment 50 may include additional devices and/or networks; fewer devices and/or networks; different devices and/or networks; or differently arranged devices and/or networks than illustrated in FIG. 2. Also, in some implementations, one or more of the devices of the comparative confidence environment 50 may perform one or more functions described as being performed by another one or more of the devices of the comparative confidence environment 50. Devices of the comparative confidence environment 50 may interconnect via wired connections, wireless connections, or a combination of wired and wireless connections.

It should be understood that, to the extent implementations of the invention collect, store, or employ personal information provided by, or obtained from, individuals (for example, sharing event data and user profile data), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 3:
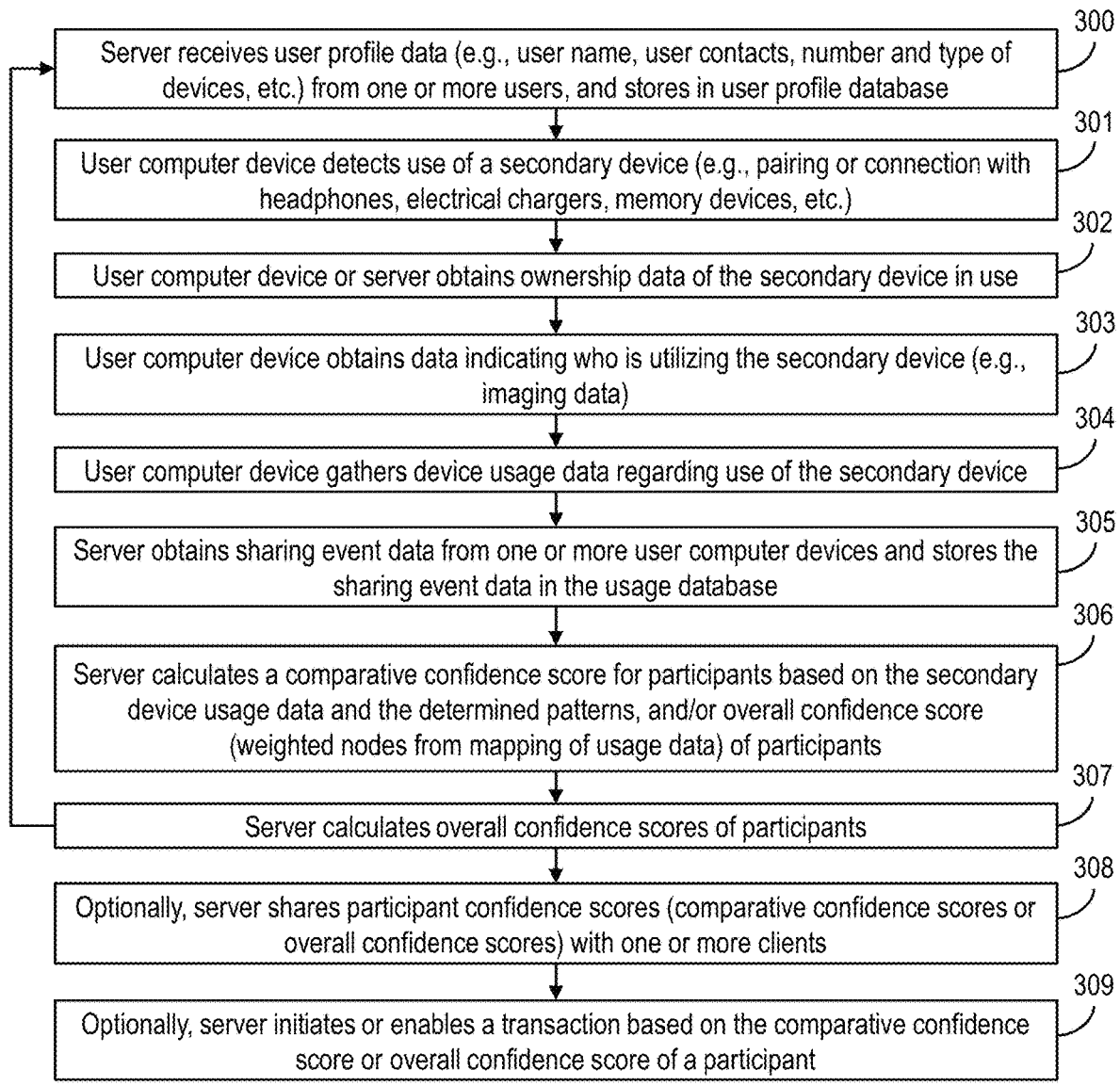
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the confidence server 60 receives user profile data for one or more participant in the comparative confidence environment 50. In aspects, the communication module 80 of the confidence server 60 receives the user profile data from one or more of the user computer devices 62 and saves the data in the user profile database 84. User profile data may include a user's identifying information, a list of user computer devices (e.g., user computer device 62) owned by the user, a list of secondary devices 64 owned by the user, a list of contacts or friends of the user (e.g., other participants in the comparative confidence environment 50 associated with a user), etc. In embodiments, participants provide user profile data to the confidence server 60 through a user interface of a user computer device 62, such as a website provide to the user by the confidence server 60.

At step 301, a user computer device 62 detects the use of a secondary device/accessory 64 (hereafter secondary device 64). In aspects, the user computer device 62 utilizes detection tools to determine that a secondary device (e.g., headphones, electrical charges, memory devices, etc.) are paired with or otherwise connected to the user computer device 62. For example, a user computer device 62 may detect that headphones are connected to the user computer device 62 (wirelessly, or via a wired connection) using available device detection methods. In implementations, image data from a camera of the user computer device 62 is utilized by the user computer device 62 (e.g., using image recognition tools) to detect the use of a secondary device 64 by the user computer device 62. In embodiments, the user computer device 62 receives user input (e.g., via a graphical user interface or keyboard) indicating that that a secondary device 64 is connected to the user computer device 62. In aspects, the usage module 70 of the user computer device 62 implements step 301.

At step 302, the user computer device 62 obtains ownership data of the secondary device 64 determined to be in use at step 301. In embodiments, the user computer device 62 determines ownership of secondary devices 64 based on an accessory database 74. For example, the user computer device 62 may recognize when a secondary device 64 not associated with the user computer device 62 (e.g., listed in the accessory database 74) is connected to the user computer device 62 and can look up ownership on a database. In aspects, the user computer device 62 receives user input (e.g., via a graphical user interface or keyboard) indicating ownership of the secondary device 64 connected to the user computer device 62. In embodiments, information gathered by the user computer device 62 related to the ownership of a secondary device 64 is forwarded to the confidence server 60, which determines who owns the secondary device 64 based on the ownership data. In aspects, the usage module 70 of the user computer device 62 implements step 302.

At step 303, the user computer device 62 obtains data identifying the user of a secondary device 64. In aspects, the user computer device 62 determines who is utilizes the secondary device 64 based on the data. In implementations, the user computer device 62 determines who is utilizes the secondary device 64 based on user input to the user computer device 62. For example, a user may enter a password or identifying data into the user computer device 62 during usage of a secondary device (i.e., a usage event), which indicates the identity of the user. In implementations, the image module 76 of the user computer device 62 captures image data utilizing one or more cameras associated with the user computer device 62 (e.g., incorporated therein or connected thereto). In aspects, the user computer device 62 utilizes the image data to determine a user who is utilizing the secondary device 64 using, for example, image recognition tools. In alternative embodiments, the user computer device 62 supplies the data identifying the user of the secondary device 64 to the confidence server 60, which utilizes the data to determine the identity of the user of the secondary device 64. For example, the confidence server 60 may utilize image recognition tools to identify a participant in the comparative confidence environment 50 who is engaged in a usage event on another participant's user computer device 62. In another example, the confidence server 60 may utilize the data to determine the identify of the user of the secondary device based on available participant data, such as user profile data in the user profile database 84. In aspects of the invention, the usage module 70 of the user computer device 62 implements step 303.

At step 304, the user computer device 62 gathers secondary device usage data regarding the use of the secondary device 64 during a sharing event. In embodiments, the user computer device 62 logs usage data in the usage log 72. In accordance with implementations of the invention, the usage data includes any data providing information regarding the use of the secondary device 64, such as duration of the use, frequency of use, type of use, type of device connection (e.g., Bluetooth, etc.), technical problems occurring during the duration of the use, number of resources shared, context of usage event (e.g., work event, personal use, use during calendared event, etc.), etc. In aspects of the invention, the usage module 70 of the user computer device 62 implements step 304. In aspects, participant devices (e.g., user computer device 62) track the frequency and duration of sharing events, an amount of resource sharing, timing of sharing, and pairing of devices with associated pairing context. In embodiments, usage data includes user input data (e.g., received through a graphical user interface or keyboard), which explicitly or implicitly indicates a level of trust (e.g., a user rating) between the authoring participant and another participant. In embodiments, usage data comprises sensor data indicating different physical aspects of a sharing event. For example, usage data may include sensor data from an accelerometer of a mobile device indicating that the mobile device was dropped on several occasions by a participant during a sharing event, and thus demonstrating that the participant may not be trustworthy with respect to using the mobile device or similar secondary devices 64. In embodiments, usage data is utilized as an indicator of the amount or degree of trust (confidence) between participants, as will be discussed in more detail below.

At step 305, the confidence server 60 obtains sharing event data from the user computer devices 62, and stores the sharing event data in the usage database 82 of the confidence server 60. The sharing event data includes one or more of: device ownership data; data regarding who is utilizing a device; and device usage data. In aspects, the confidence server 60 obtains sharing event data from multiple participants via respective user computer devices 62. In implementations, the confidence server 60 updates the usage database 82 on a continuous or periodic basis based on the sharing event data received according to step 305.

At step 306, the confidence server 60 determines comparative confidence scores between participants based on sharing event data received at step 305. In embodiments, the confidence server 60 analyzes the usage data for patterns, calculates a comparative confidence score between a first participant and a second participant, and saves the comparative confidence score for the first participant with respect to the second participant in the confidence score database 87. In aspects, the confidence server 60 determines one or more patterns based on: (1) who is using whose user computer device(s) 62 and/or secondary device(s) 64; (2) how long the user computer device(s) 62 and/or secondary device(s) 64 is used (e.g., duration of sharing event); (3) at what frequency are other's user computer device(s) 62 and/or secondary device(s) 64 utilized; and what contextual situation is associated with a sharing event.

With continued reference to step 306 of FIG. 3, in one example, a participant A and a participant B always share or borrow each other's resources (e.g., user computer devices 62 and secondary device 64), while participant A and participant C rarely share one another's resources. In this example, the confidence server 60 calculates a higher comparative confidence score for participant B with respect to participant A than the comparative confidence score calculated for participant C with respect to participant A. In embodiments, the confidence server 60 utilizes machine learning tools and techniques (e.g., neural networks) to identify comparative confidence scores between individual participants. In aspects, the confidence server 60 utilizes machine learning techniques to identify links between other pairs of participants based on the comparative confidence scores of first and second participants. In implementations, the confidence score module 86 of the confidence server 60 calculates comparative confidence scores for participants within the comparative confidence environment 50.

Thus, in implementations, the confidence server 60 determines that two participants confidence each other based on patterns of sharing and borrowing of devices (e.g., headphones, mobile phone chargers, pen drives, mobile devices, memory and other resources, etc.), and/or patterns of pairing of devices (e.g., to transfer files, etc.) of respective participants. In aspects, machine learning techniques are utilized by the confidence server 60 to identify confidence scores between a pair of users (e.g., a confidence node between participants), and may utilize the confidence score to recommend to participants in the comparative confidence environment 50 who can be trusted, thus creating a confidence network of participants.

At step 307, the confidence server 60 optionally calculates overall confidence scores for participants with the comparative confidence environment 50. For example, comparative confidence scores may be weighted and utilized by the confidence server 60 to calculate an overall confidence score for each participant in the comparative confidence environment 50. In aspects, a matrix of confidence scores for participant in the comparative confidence environment 50 is generated and maintained by the confidence server 60, and edges of the matrix representing individual comparative confidence scores between participants are utilized to generate overall confidence scores for individual participants in the comparative confidence environment 50. Moreover, in embodiments, the confidence server 60 utilizes the matrix of comparative confidence scores to identify one or more trusted groups within the comparative confidence environment 50. In this case, trusted group information may be utilized to infer different confidence levels for different participants, based on their association with other participants within the matrix. In implementations, the confidence score module 86 of the confidence server 60 calculates overall confidence scores for participants within the comparative confidence environment 50.

At step 308, the confidence server 60 optionally shares confidence scores of participants (comparative confidence scores and/or overall confidence scores) with one or more clients (e.g., client devices 66). In embodiments, the clients pay a fee to the confidence server 60 to provide them with confidence scores for participants (e.g., potential customers of the client). In aspects, the confidence score module 86 of the confidence server 60 shares confidence scores with authorized clients (e.g., via the client devices 66).

At step 309, the confidence server 60 optionally initiates or enables a transaction based on the comparative confidence score or overall confidence score of a participant. In embodiments the permissions module 88 determines at step 309 whether to grant permissions or authorize a transaction of a participant based on a confidence score of the participant(s). In embodiments, the confidence server 60 automatically initiates a transaction based on the confidence score of a participant. In implementations, the confidence server 60 notifies another party (e.g., a client device 66) that the participant is granted permission or authorized to conduct a transaction based on the confidence score of the participant. In implementations, the confidence server 60 determine whether to initiate or enable a transaction based on the confidence score of a participant and one or more predetermined parameters (e.g., threshold parameters).

In one embodiment, the confidence server 60 grants access to a device of a first participant to another participant based on a comparative confidence score calculated for the first and second participants. In implementations, the confidence server 60 automatically grants a participant access to a resource (electrical device or non-electrical device) based on a confidence score associated with the participant. In aspects, the confidence server 60 sends a notification (e.g., a permission notification) to another participant (e.g., client device 66) indicating that a participant should be granted access to a resource (electrical device or non-electrical device) based on a confidence score associated with the participant. In another embodiment, the confidence server 60 is configured to authorize or deny a loan (e.g., a loan of money or of a resource), or establish parameters with respect to the loan (e.g., price, duration, geographic usage limitations, etc.), based on a confidence score associated with a participant who requests the loan. In implementations, the confidence server 60 authorizes or denies types of advertising among participants of the comparative confidence environment 50 based on confidence scores of participants.

In embodiments, the confidence server 60 continuously or periodically updates confidence score calculations based on incoming sharing event data. In one example, the confidence server 60 grants access to a device of a first participant to a second participant based on a comparative confidence score of the first and second participant, the first participant utilizes the device during a sharing event, then the confidence server 60 updates the confidence score of the first and second participants based on sharing event data (including context data) generated during the sharing event. Thus, confidence scores of participants in the comparative confidence environment 50 can be continuously and automatically updated to reflect real-world dynamics between participants.

It should be understood that the confidence scores of the present invention may be utilized for various applications including: confidence-based device authentication and authorization (e.g., trusted users can be granted greater access to a given shared resource or device); automatic approval (e.g., users with an established high confidence score can be automatically approved for other tasks not related to a shared device); and targeted advertisement (e.g., establishing a hierarchy of confidence enables better targeted advertising, for example by sharing what trusted friends have purchased).

Based on the exemplary method steps of FIG. 3, it can be understood that the present invention provides for the following implementation steps. In embodiments, each and every device or device accessory (e.g., user computer devices 62 and secondary devices 64) in the comparative confidence environment 50 is uniquely identified by the confidence server 60, and is mapped to a particular user who owns the devices or device accessories. In implementations, when any device accessory is attached to any device in the comparative confidence environment 50, the device will recognize that it is connected to the device accessory. In embodiments, when any connectivity is established between any pair of devices or device accessories in the comparative confidence environment 50, the confidence server 60 identifies the connection. In aspects, voice recognition or facial recognition is utilized by the user computer device 62 or confidence server 60 to determine if a device is borrowed, and to identify who is using whose device.

In implementations, participating devices (e.g., user computer device 62) keep a log of which accessories are used, whose accessories are used, the frequency of use, the duration of time the accessories where used, and/or surrounding context. For example, a user computer device 62 may determine how many times a participant has borrowed their friend's mobile phone charger, how long the participant kept the mobile phone charger, etc. In implementations, devices within the comparative confidence environment 50 track resource sharing (e.g., how many times a participant has borrowed a pen drive of a friend, how much memory of the pen drive the participant used, etc.). In aspects, the confidence server 60 of the comparative confidence environment 50 tracks the pairing of devices (e.g., Bluetooth pairing) and/or the sharing of data between devices. In implementations, the confidence server 60 utilizes a usage log (e.g., usage log 72, usage database 82) to identify: who is using whose device or device accessories; at what frequency the other's device or device accessories are used; and the context associated with a sharing event. Thus, in implementations, the confidence server 60 calculates the comparative confidence scores between any pair of users by analyzing patterns of the logged usage data.

Figure 4:
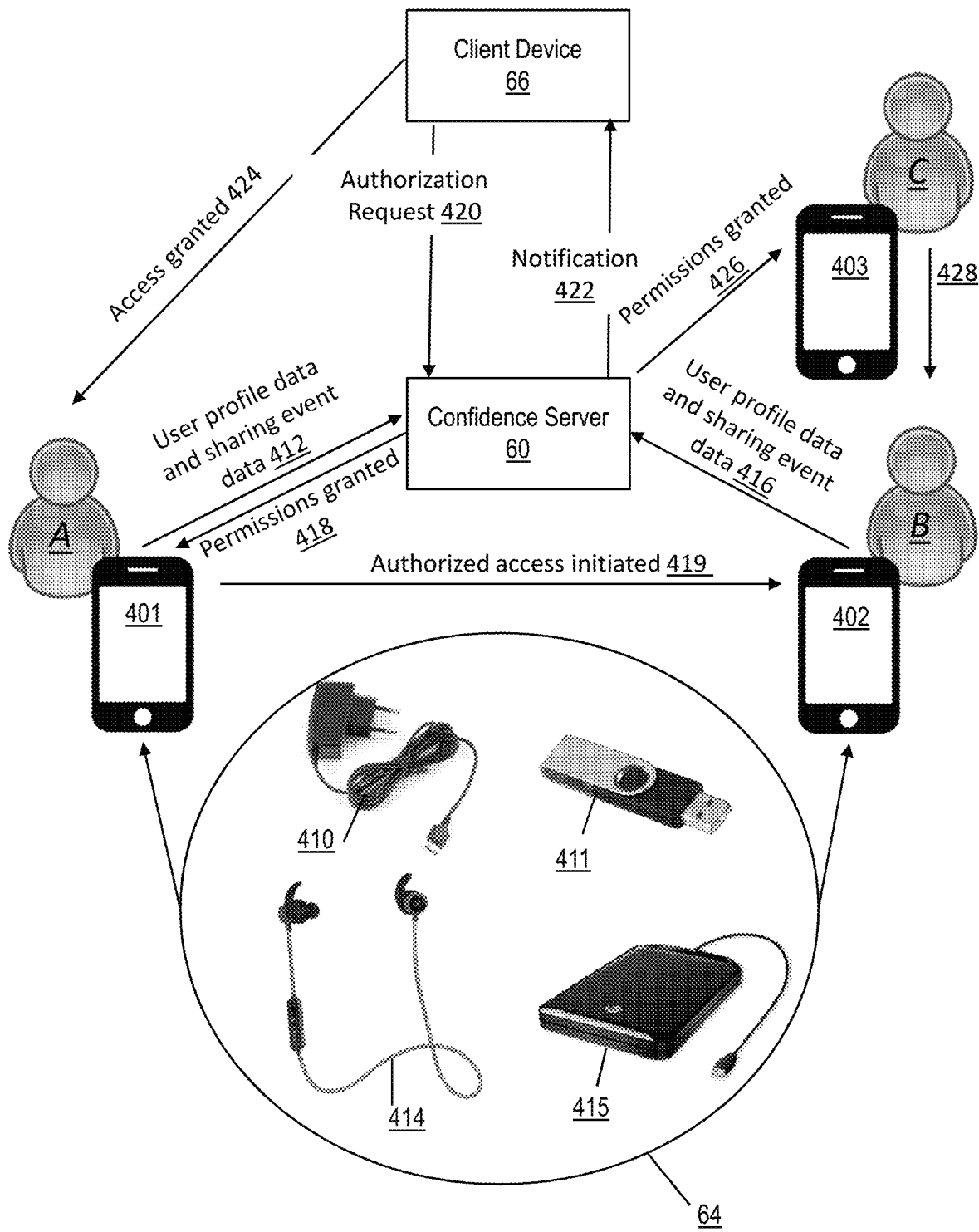
FIG. 4 illustrates an exemplary use scenario in accordance with embodiments of the invention.

FIG. 4 illustrates an exemplary use scenario in accordance with embodiments of the invention. The scenario of FIG. 4 may be performed in the environment illustrated in FIG. 2, and in accordance with steps of FIG. 3.

As illustrated in FIG. 4, a first participant A is the owner of a first mobile device 401 (e.g., a user computer device 62), and a second participant B is the owner of a second mobile device 402 (e.g., a user computer device 62). In accordance with step 300 of FIG. 3, the first and second participants A and B each send the confidence server 60 user profile data. In the scenario shown, the first participant A shares an electrical charger 410 and a memory device 411 with the second participant B over time, and participant B's mobile device 402 records data regarding the sharing events (sharing event data) and sends sharing event data to the confidence server 60 at 412. In the scenario of FIG. 4, the sharing event data includes ownership data regarding ownership of the electric charger 410, memory device 411 and the mobile device 402, as well as usage data regarding the use of the electrical charger 410 and memory device 411 (secondary devices 64) in accordance with steps 302-304 of FIG. 3. Additionally, the second participant B shares headphones 414 and a storage device 415 (secondary devices 64) with the first participant A over time, and participant A's mobile device 401 records data regarding the sharing events (sharing event data) and sends sharing event data to the confidence server 60 at 416. In the scenario of FIG. 4, the sharing event data includes ownership data regarding ownership of the secondary devices 64 and the mobile devices 401 and 402, as well as usage data regarding the use of the secondary devices 64 in accordance with steps 302-304 of FIG. 3.

With continued reference to FIG. 4, the confidence server 60 stores the sharing event data in the usage database 82 depicted in FIG. 2, and analyzes the sharing event data utilizing machine learning techniques (e.g., neural networks). In this scenario, the usage data includes information regarding the context of the sharing events, frequency of the sharing events, and duration (time) of the sharing events. Utilizing this data, the confidence server 60 calculates a comparative confidence score between the first participant A and the second participant B. Once the comparative confidence score is derived, various applications related to participants' confidence can be implemented.

In the example shown, the confidence server 60 receives a request for access from either the first or second mobile device 401 or 402, wherein the request indicates that the first mobile device 401 is requesting access to the second mobile device 402 (e.g., access to a resource or data of the second mobile device 402). The confidence server 60 determines based on confidence scores of the first participant A that the mobile device 401 of the first participant A meets a predetermined threshold value of confidence, and enables the connection of the mobile device 401 to the mobile device 402. In the example shown, permission data (e.g., user password) is sent from the confidence server 60 to the mobile device 401, as indicated at 418, which enables the mobile device 401 to access the resources of the mobile device 402 based on the confidence score (e.g., overall confidence score or comparative confidence score) of the first participant A. Accordingly, the mobile device 401 accesses the mobile device 402 utilizing the permission data as indicated at 419. In this example, the mobile device 402 receives a password from the user computer device 401 authorizing the mobile device 401 to access a resource of the mobile device 402.

Still referencing FIG. 4, comparative confidence scores across multiple participants may be utilized to generate an overall confidence score for each of the participants A and B. In the scenario shown, a client device 66 at a lending institution (e.g., library) receives confidence scores for the participants A and B. Specifically, upon scanning a card (e.g., library card), the confidence server 60 is informed that the associated participant wishes to borrow a resource (authorization request 420), and sends the client device 66 a notification 422 regarding the trustworthiness of the participant (e.g., as indicated by an overall confidence score of the participant). In this scenario, the lending institution makes decisions with respect to the lending of an item to the participant A based on the notification (e.g., a confidence score of participant A) received from the confidence server 60. In this example, the confidence score meets a predetermined threshold level, indicating to the lending institution that the participant A is authorized to borrow an article from the lending institution (e.g., a laptop computer, book, or other resource) without requiring any monetary deposit or the like from the participant A. In this scenario, the participant A is granted permission to access a resource of the client at 424. Thus, in accordance with embodiment of the invention, confidence scores can be utilized by clients to determine prices associated with a sharing event (e.g., rental rates, deposits, flat fees, etc.).

With continued reference to FIG. 4, comparative confidence scores of participants with the comparative confidence environment 50 are utilized by the confidence server 60 to derive confidence scores of other participants within the comparative confidence environment 50. In this example, a participant C has a high confidence score based on his/her associations within the comparative confidence environment 50. In this case, when the participant C requests access to a resource of participant B's, the confidence server 60 grants permission to the participant C at 426, and the mobile device 402 enables the mobile device 403 of participant C to access the resource at 428, based on the permission granted by the confidence server 60.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for deriving confidence scores based on device sharing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In one exemplary computer-implemented method, a computing device performs the following steps: calculating a comparative confidence score for a first user and a second user; granting access to a device of the first user to the second user based on the calculated comparative confidence score; and modifying the calculated comparative confidence score of the first and the second user based on usage details of the device and context for which the device was used. In implementations, the usage details comprise: a length of time the device was borrowed and the frequency of use of the device, frequency the device is borrowed, and the device resources used during the second user's access of the device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computing device, sharing event data from a remote computing device in a comparative confidence environment, the sharing event data including usage data regarding the sharing of an electronic device between a first participant and a second participant obtained by the remote computing device during a sharing event;
calculating, by the computing device, a comparative confidence score for the first participant and the second participant based on the sharing event data, wherein the comparative confidence score represents a level of trust between users;
generating, by the computing device, a matrix of confidences scores of a plurality of participants, including the first participant and the second participant, wherein edges of the matrix represent individual comparative confidences scores between participants;
calculating, by the computing device, an overall confidence score of the first participant based on the edges of the matrix; and
enabling, by the computing device, the first participant to gain access to another electronic device belonging to the second participant based on the comparative confidence score.

2. The computer-implemented method of claim 1, wherein the enabling the first participant to gain access to the other electronic device belonging to the second participant comprises automatically granting the first participant access to the other electronic device.

3. The computer-implemented method of claim 1, wherein the enabling the first participant to gain access to the other electronic device belonging to the second participant comprises sending a notification to the second participant that the first participant should be granted access to the other electronic device belonging to the second participant.

4. The computer-implemented method of claim 1, wherein the sharing event data comprising one or more selected from the group consisting of: information regarding a pairing of the electronic device with another electronic device, and implicit or explicit user ratings.

5. The computer-implemented method of claim 1, wherein calculating the comparative confidence score comprises a machine learning tool of the computing device calculating the comparative confidence score based on the usage data regarding use of the electronic device during the sharing event and context data regarding the sharing event.

6. The computer-implemented method of claim 1, wherein the other electronic device belonging to the second participant is selected from the group consisting of: headphones, a memory device, an electrical charger, and a mobile computing device.

7. The computer-implemented method of claim 1, further comprising:
receiving, by the computing device, additional sharing event data from the second participant regarding the first participant accessing the other electronic device belonging to the second participant during a second sharing event; and
updating, by the computing device, the comparative confidence score of the first participant based on the additional sharing event data.

8. A computer program product comprising a computer readable storage medium having program instructions embodied therewith, the program instructions executable by a computing device of a first participant, to cause the computing device of the first participant to:
determine sharing event data regarding a sharing event wherein the computer device of the first participant utilizes a secondary device of a second participant, the sharing event data including usage data regarding usage of the secondary device;
send the sharing event data to a remote confidence server;
receive from the remote confidence server a notification indicating an overall confidence score of the second participant based on the sharing event data and on multiple comparative confidence scores calculated for the second participant based on other sharing event data, wherein the overall confidence score is determined from a matrix of confidences scores of a plurality of participants, including the first participant and the second participant, wherein edges of the matrix represent individual comparative confidences scores between participants; and
enable, by the computing device, a remote electronic device of the second participant access to a resource of the computing device of the first participant based on the notification.

9. The computer program product of claim 8, wherein the notification further indicates that a third participant has a confidence score enabling them to access the resource, and wherein the third participant is enabled to access the resource via the remote electronic device of the second participant based on the confidence score, which is determined by the confidence server based in part on the sharing event data.

10. The computer program product of claim 8, wherein the notification indicates that the second participant has a comparative confidence score enabling them to access the resource, and wherein the second participant is further enabled to access the resource via the remote electronic device of the second participant based on the comparative confidence score, which is determined by the confidence server based in part on the sharing event data.

11. The computer program product of claim 8, wherein the sharing event data comprising one or more selected from the group consisting of: information regarding who owns the secondary device, information regarding who is using the secondary device, information regarding context of the sharing event, information regarding timing of the sharing event, information regarding duration of the sharing event, information regarding a pairing of the computer device of the first participant with the secondary device, implicit or explicit user ratings, and information regarding the secondary device.

12. The computer program product of claim 8, wherein the secondary device is selected from the group consisting of: headphones, a memory device, an electrical charger, and a mobile computing device.

13. A system comprising:
a processor, a computer readable memory and a computer readable storage medium associated with a computing device;
program instructions to receive sharing event data from a remote computing device in a comparative confidence environment, the sharing event data including usage data regarding the sharing of an electronic device between a first participant and a second participant during a sharing event;

program instructions to calculate a comparative confidence score for the first participant and the second participant based on the sharing event data, wherein the comparative confidence score represents a level of trust between users;

program instructions to generate a matrix of confidence scores of a plurality of participants, including the first participant and the second participant, wherein edges of the matrix represent individual comparative confidences scores between participants;

program instructions to calculate an overall confidence score of the first participant based on the edges of the matrix; and program instructions to issue permissions to enable the first participant to gain access to an electronic device accessory of the second participant based on the comparative confidence score or the overall confidence score, wherein the program instructions are stored on the computer readable storage medium for execution by the processor via the computer readable memory.

14. The system of claim 13, wherein the issuing permissions comprises sending a notification to the second participant.

15. The system of claim 13, wherein the issuing permissions comprises sending a notification to the first participant.

16. The system of claim 13, wherein the sharing event data comprises one or more selected from the group consisting of: information regarding who owns the electronic device, information regarding who is using the electronic device, information regarding how the electronic device is being used, information regarding context of the sharing event, information regarding timing of the sharing event, information regarding duration of the sharing event, information regarding a pairing of the electronic device with another electronic device, implicit or explicit user ratings, and information regarding the electronic device.

17. The system of claim 13, wherein calculating the comparative confidence score comprises a machine learning tool of the computing device calculating the comparative confidence score based on the usage data regarding use of the electronic device during the sharing event and context data regarding the sharing event.

18. The system of claim 13, further comprising:

program instructions to receive additional sharing event data from the second participant regarding the first participant accessing the electronic device accessory of the second participant during a second sharing event; and program instructions to update the comparative confidence score of the first participant based on the additional sharing event data.

19. The method of claim 1, wherein the usage data includes sensor data indicating that the electronic device was dropped during a sharing event.

* * * * *